United States Patent
Pena

(10) Patent No.: US 6,199,805 B1
(45) Date of Patent: Mar. 13, 2001

(54) STAND FOR HAIR DRYER

(76) Inventor: Rebecca G. Pena, 1306 Mimosa Rd., Missouri City, TX (US) 77489

( * ) Notice: Subject to any disclaimer, the term of this patent is extended or adjusted under 35 U.S.C. 154(b) by 0 days.

(21) Appl. No.: 09/184,184

(22) Filed: Nov. 2, 1998

(51) Int. Cl.$^7$ .................................................. A47G 29/00
(52) U.S. Cl. ..................... 248/125.8; 248/160; 248/161
(58) Field of Search .................................. 248/104, 107, 248/511, 515, 523, 125.7, 125.8, 125.9, 160, 161, 157, 176.3, 176.1, 231.91

(56) References Cited

U.S. PATENT DOCUMENTS

| | | | | |
|---|---|---|---|---|
| 1,232,690 | * | 7/1917 | Keenan | 248/103 |
| 1,735,949 | * | 11/1929 | Brady | 248/160 |
| 1,790,500 | * | 1/1931 | Fischer | 248/160 |
| 1,796,384 | * | 3/1931 | McElroy | 248/161 |
| 2,204,508 | * | 6/1940 | Matthies | 248/160 |
| 2,481,271 | * | 9/1949 | Willey | 248/160 |
| 2,535,803 | * | 12/1950 | Maack | 248/160 |
| 2,597,670 | * | 5/1952 | Pinto | 248/160 |
| 2,767,946 | * | 10/1956 | Weeks | 248/74.1 |
| 4,225,106 | | 9/1980 | Eplan | 248/309.1 |
| 4,278,223 | | 7/1981 | Fauteux | 248/125 |
| 4,466,203 | | 8/1984 | Thomas | 34/99 |
| 4,706,915 | * | 11/1987 | Cindric et al. | 248/125.8 |
| 4,712,313 | | 12/1987 | Gettleman | 34/97 |
| 5,359,461 | * | 10/1994 | Rice et al. | 359/874 |
| 5,630,517 | * | 5/1997 | Maznik | 211/70.6 |
| 5,636,815 | | 6/1997 | Wilson | 248/125.9 |
| 5,737,847 | | 4/1998 | Britton | 34/97 |
| 5,842,670 | * | 12/1998 | Nigoghosian | 248/160 |
| 5,937,537 | * | 8/1999 | Miller | 248/160 |

* cited by examiner

*Primary Examiner*—Ramon O. Ramirez
*Assistant Examiner*—Gwendolyn Baxter
(74) *Attorney, Agent, or Firm*—Browning Bushman

(57) ABSTRACT

A self supporting adjustable support stand for a portable hair dryer HD includes a support base 10 for stabilizing the stand, a telescopically adjustable extension subassembly 20 for selective height adjustment, an elongated flexible connection 40, and a ring shaped holder 50. The extension subassembly 20 includes at least first 22 and second 24 support members and one support locking member 30. The portable hair dryer HD may be positioned within a ring shaped holder 50 at the upper end of the stand, allowing a person to have their hands free during operation. Securing members may be attached to the ring shaped holder 50 to help position the portable hair dryer HD. The flexible extension 40 is selectively positionable with respect to the telescopic extension axis 32 both in a direction parallel to the extension axis, and in directions within a plane perpendicular to the extension axis such that an attached hair dryer may be selectively positionable at multiple locations. The support stand may also include a hairbrush receptacle 70 affixed on top of the support base 10 and having a throughbore 72 in its base for receiving the telescopically adjustable extension subassembly 20.

19 Claims, 2 Drawing Sheets

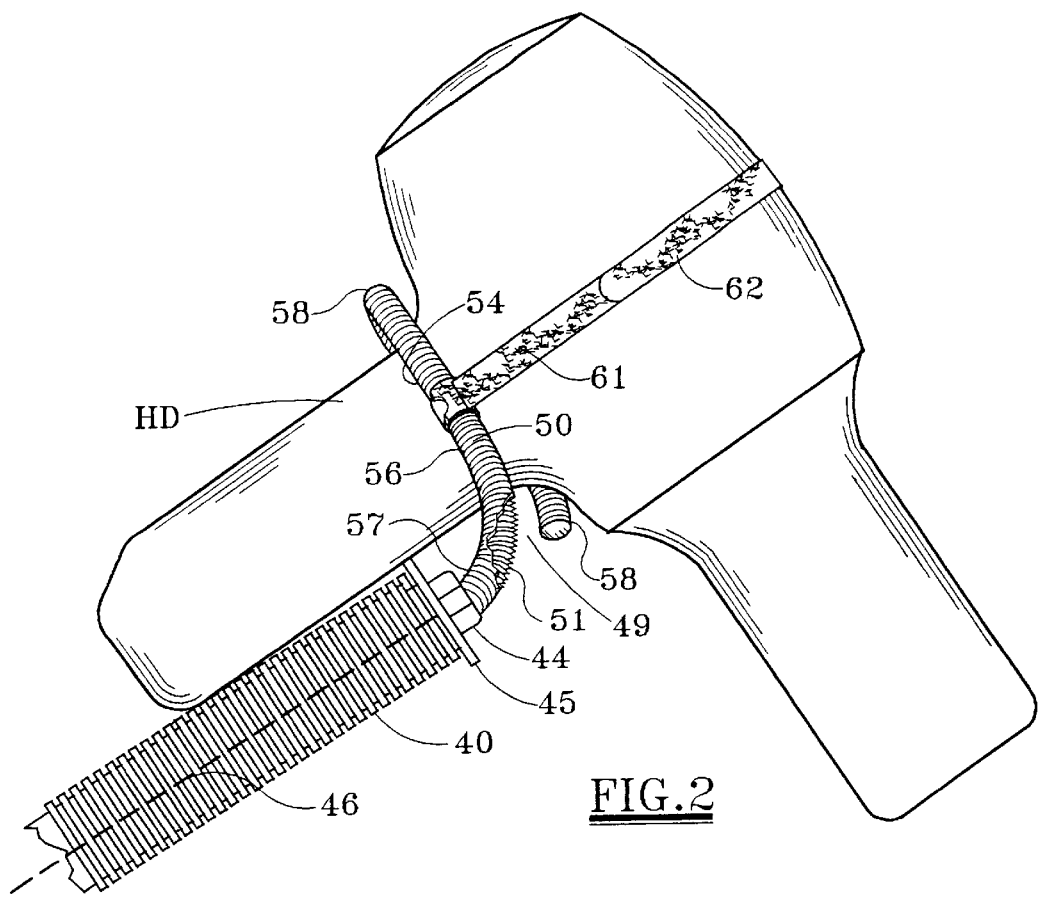
FIG. 2
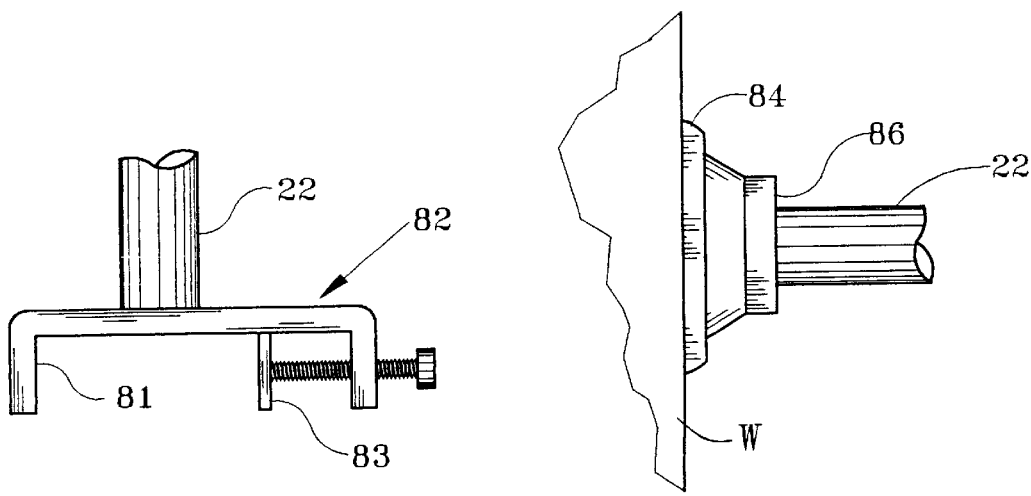
FIG. 3
FIG. 4

STAND FOR HAIR DRYER

FIELD OF THE INVENTION

The present invention generally relates to a support stand for small hand held devices. More specifically, this invention relates to an economical, self-supporting telescopically adjustable support stand for a portable hand held hair dryer which enables the operation of the hair dryer hands free.

BACKGROUND OF THE INVENTION

Hand held, lightweight hair dryers have become extremely popular and are well known in the art. In the common household, these hand held dryers have replaced, the bonnet-type hair dryers now normally only associated with hair salons or similar commercial establishments. Moreover, many hair salons use the bonnet type hair dryers only for special treatments, and increasingly use portable hand held hair dryers to achieve both speed and flexibility for the customer. Initially, the hand held hair dryers could not produce the desired heat generated by bonnet-type hair dryers, but in recent years have been able to produce comparable amounts of heated air.

The obvious advantages to the hand held hair dryers is their portable nature and low cost relative to the bulky bonnet-type hair dryers. Hand held hair dryers commonly have an ergonomic shape to fit in the palm of the hand and, due to plastics technology, are extremely lightweight. However, a primary advantage still accompanied with the bonnet type hair dryers is that the hands are free to utilize the various accessories available for manipulating the hair during drying.

During the recent growth of these hand held hair dryers, users have been trying to incorporate this primary advantage of the bonnet-type hair dryers without losing the portability and low cost of the hand held hair dryers. Numerous inventions have been devised to take the place of the hands while operating the hand held hair dryers. U.S. Pat. Nos. 4,225,106, 4,278,223, 4,466,203, 4,712,313, 5,636,815 and 5,737,847 disclose various stands for hair dryers. These stands or holders have several undesirable features and disadvantageous which have limited their acceptance in the marketplace. Most of these stands are complex, employing either a "jaw" type or other clamping device to lock the hair dryer in place. All of these devices are limited in their ability to easily move the hair dryer to a selected position as periodically determined by the user. Some of the devices are dependent on being mounted to a chair or wall, and are thus not self-supporting. Other support stands require a specially configured hair dryer, and are not easily useable with the vast bulk of differently configured hair dryers already in the marketplace.

The disadvantages of the prior art are overcome by the present invention, and an improved self-supporting telescopically adjusting stand for selectively positioning a conventional hand held hair dryer is hereinafter disclosed. None of the prior art disclose or suggest the unique combination of features set forth in the present invention.

SUMMARY OF THE INVENTION

Due to the disadvantages in the prior art relating to support stands for hand held hair dryers, the present invention in one embodiment provides an improved telescopically adjustable height stand and a flexible conduit for positioning the attached hair dryer. A primary objective of the present invention is to provide a relatively simple and economical self-supporting stand for holding a portable hair dryer, with the stand achieving the advantages sought in the bonnet type hair dryers combined with the advantages of a portable and economical hand held hair dryer.

In a preferred embodiment, the present invention comprises a support base for stabilizing the stand, a telescopically adjustable extension for selective height adjustment comprised of at least two tubular members and one support locking member, a flexible conduit or other elongated flexible connection, and a ring-shaped holder. A portable hair dryer is supported on the ring shaped holder, allowing a person to have their hands free during operation. The flexible extension is selectively positionable with respect to the telescopic extension axis both in a direction parallel to the extension axis and in directions within a plane perpendicular to the extension axis, such that an attached hair dryer may be selectively positionable at multiple locations.

It is an object of the present invention to provide an improved self-supporting telescopically adjustable stand for a hand held hair dryer that achieves the advantages of the bonnet-type hair dryers combined with the advantages of hand held hair dryers.

It is another object of the present invention to provide a self-supporting telescopically adjustable stand that will allow a user to operate any one of various types and styles of portable hair dryers without having to hold the dryer.

Yet another object of this invention is to provide a self-supporting telescopically adjustable stand that allows the supported hair dryer to be easily and quickly positioned at a desired height and angle relative to a base.

Still another object of the present invention to provide a self-supporting telescopically adjustable stand that is simple in nature, is durable, and is economical to manufacture, thereby keeping the ultimate consumer cost low.

It is a feature of the present invention that the self-supporting telescopically adjustable stand is portable and easily moved.

Yet another feature of the invention is the use of a generally ring-shaped support for receiving the handle of the hair dryer. A pair of straps each secured to the support may be used to reliably position the hair dryer relative to the ring-shaped support. The ring-shaped support may comprise a metal threaded rod which is rubber coated to increase frictional engagement with the hair dryer while minimizing any damage to the hair dryer.

Still another feature of the invention is the incorporation of a hair brush or hair accessories receptacle positioned on the base and about the telescopic support subassembly.

An advantage of the invention is that the assembly may be economically manufactured. Most components, including the base, may be fabricated from metal.

Another advantage of the invention is that the self supporting base may be replaced with a clamp for securing the assembly to a chair, counter, or table, or with a wall mount so that the assembly is normally supported by a wall when in use.

These and further objects, features and advantages of the present invention will become apparent from the following detailed description, wherein reference is made to the figures in the accompanying drawings.

BRIEF DESCRIPTION OF THE DRAWINGS

FIG. 2 is a detailed perspective view of the upper portion of the support stand shown in FIG. 1 with a hair dryer supported thereon;

FIG. 3 is a side view of a portion of an alternate embodiment of the invention, with a clamp for securing the support to a chair or similar foundation; and FIG. 4 is a side view of an alternate embodiment of the invention, with a mount secured to the wall.

DETAILED DESCRIPTION OF PREFERRED EMBODIMENTS

Figure 1:
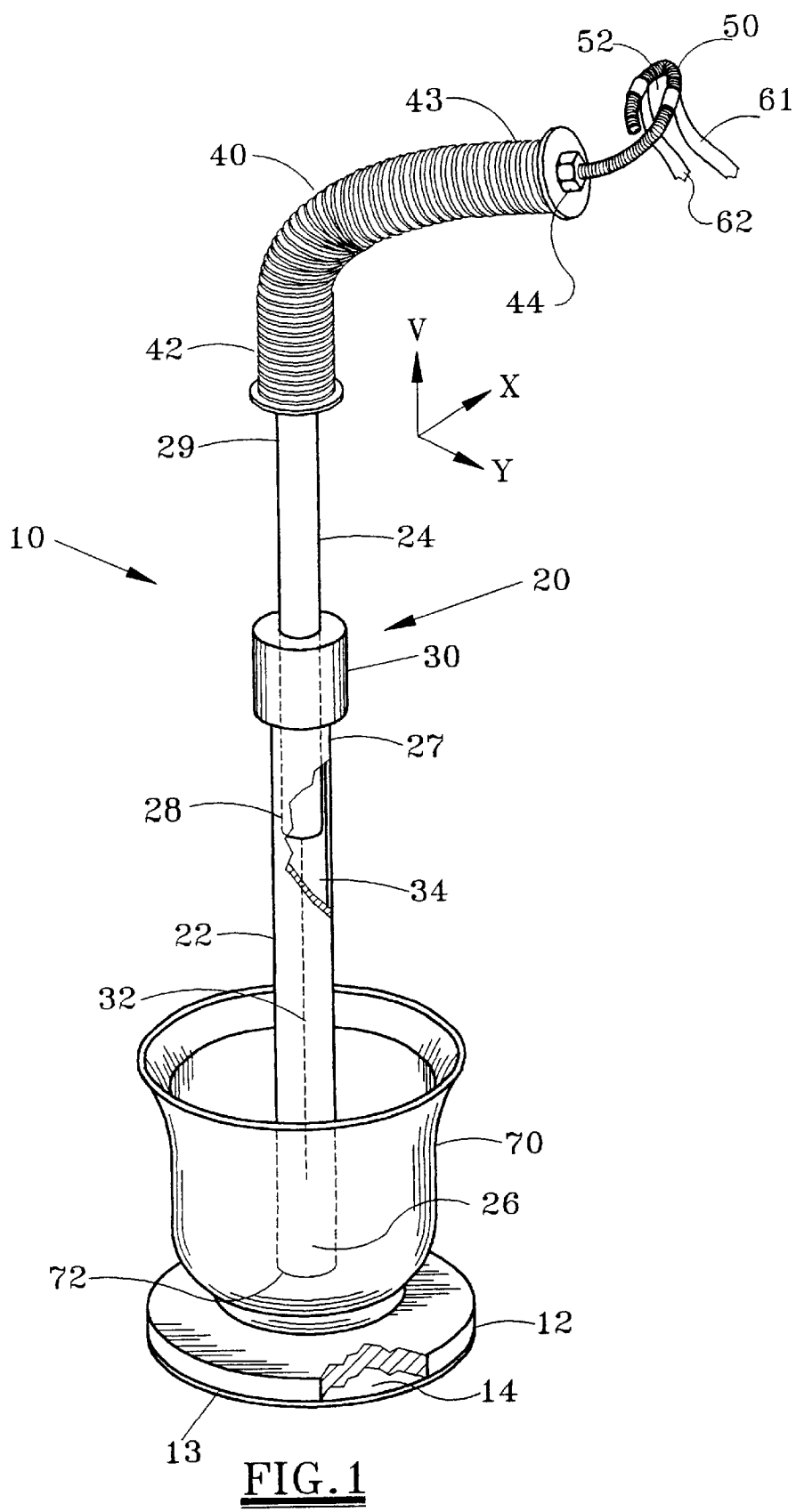
FIG. 1 is a perspective view of a preferred embodiment of the present invention.

FIG. 1 illustrates a preferred embodiment of a self-supporting telescopically adjustable stand according to the present invention. The self-supporting telescopically adjustable stand 10 for a portable hair dryer comprises a support base 12 having a weight sufficient to stabilize the stand 10 and the supported portable hair dryer. The support base 12 is formed from a relatively heavy material, preferably metal, and has a substantially planar lower supporting surface 13. The base 12 may thus be desirably positioned at a suitable location by the user, such as on a table or countertop. The support base 12 may incorporate a non-slip pad 14 having a general configuration conforming to the base 12 and secured to the substantially planar lower supporting surface 13. The single pad 14, which may be formed from a rubber-like and electrically insulating material, may be replaced with three or more small rubber disks which substantially increase frictional engagement with a countertop and thereby reduced the likelihood of base 12 slipping on the countertop. The non-slip pad 14 is not essential, particularly if the base is not fabricated from metal, and instead the support base 12 may make direct contact with the supporting surface. The support base 10 preferably is disk shaped. Alternatively, the base 12 may have any polygonal configuration.

FIG. 1 further depicts a telescopically adjustable extension subassembly 20 having an extension axis 32 substantially perpendicular to the planar lower supporting surface 13 of support base 12. The extension subassembly may be press fit within a hole in the support base 12, or may be threaded, tack welded or otherwise secured to support base 12. The extension subassembly 20 is preferably secured to the base 12 at the geometric center of the base to enhance the stability of the assembly. The telescopically adjustable extension subassembly 20 includes at least a first lower 22 and second upper 24 support members, and at least one locking member 30. The first support member 22 has a lower end 26 fixedly secured to the support base 12 and an upper end 27 which supports the locking member 30. The tubular support member 22 has an interior bore 34 therein to slidingly receive the second support member 24 therein, such that the height of the extension subassembly 20 relative to the base 12 may be selectively adjusted and temporarily fixed by the at least one support locking member 30. The second support member 24 is also preferably a tubular member, and includes a lower end 28 depicted partially within the support member 22 and an upper end 29. Those skilled in the art will appreciate that for each support member greater than two, there should be a corresponding locking member to lock the new support member into position. Each new support member would thus include upper and lower ends and will be slidingly received within a corresponding larger diameter support member.

Various types of locking members 30 may be conventionally used to temporarily lock the position of one support member relative to another support member. The locking member 30 may be easily activated (locked) and deactivated (unlocked) by rotating the locking member relative to the lower tubular support. Each support is preferably also formed from metal, and the upper support members 24 is preferably tubular, but could have another geometric configuration. A support subassembly for positioning the stand on a table or counter may be adjusted so that its height from the base 12 may vary from about 12" to about 30". A suitable support assembly 20 is manufactured and sold by Keson Industries, Incorporated in Naperville, Ill. as a component for a walk-along measuring tape, Model RR 112.

The lower or supported end 42 of an elongated flexible extension 40 may be secured to the upper end 29 of the second support member 24, as shown in FIG. 1. The extension 40 may be secured to the subassembly 20 by a press fit engagement, by a tack weld, by a clamp, by a thread, or other conventional securing technique. The extension 40 preferably is fabricated from a metal flexible conduit or gooseneck so that it can easily flex or bend into various configurations. If desired, the spacing between the axially spaced loops on the flexible conduit may be adjusted to allow the axial length of the extension 40 to be varied. Alternatively, the vertical height of the upper end 43 of the conduit relative to the upper end 29 of the second support member 24 may be adjusted by providing multiple bends along the length of the conduit 40. Adjustable extension 40 may be provided with a flexible conduit sold by New Advance Industrial Co., Ltd. in Taipei, Taiwan, Republic of China, and in a preferred embodiment has a length of from at least 6" to 12". The flexible conduit 40 may be formed from metal or plastic and, if formed from metal, preferably has a plastic outer coating to facilitate easy cleaning.

The non-supported or upper end 43 of the elongated flexible extension 40 may thus be selectively positionable with respect to the supported end 42 both in a direction parallel to the extension axis 32 (the v-direction as shown in FIG. 1) and in directions within a plane perpendicular to the extension axis (the x-direction and y-direction as shown in FIG. 1). This flexibility allows for the upper or terminal end 43 of the flexible extension 40 to be selectively positionable relative to the supported end 42 at multiple locations. The flexible conduit 40 also preferably allows for at least limited rotation of the terminal or upper end 43 of the flexible extension 40 with respect to the lower or supported end 42 of the flexible extension 40 about the elongated flexible extension axis 46, as shown in FIG. 2. This rotation allows the user to selectively rotate at least slightly the terminal end of the elongated flexible extension, thereby tilting the holder 50 and positioning the portable hair dryer HD at the optimal angle desired by the user.

A generally ring-shaped holder 50 is secured to the terminal end of the elongated flexible extension 40. In one embodiment, a conventional nut 44 is secured to the flexible extension 40, and the holder 50 is then threadably secured to the nut. A washer or end plate 45 may be conventionally secured to the flexible extension 40, and the nut 44 then welded or otherwise secured to the washer, The generally ring-shaped configuration of the holder 50 creates a passage 52 for receiving for the handle of a portable hair dryer HD. The end or terminal portion 58 of the generally ring-shaped holder 50 is not in contact with the holder, and instead creates a gap 49 therebetween, as shown in FIG. 2. This gap 49 allows the hair dryer electrical cord (not shown) to pass therebetween, so that the hair dryer may be easily positioned in and removed from the support stand.

The ring-shaped holder 50 has a friction-enhancing interior surface 54 along at least a substantial length thereof for engagement with the handle of the portable hair dryer HD to further aid in stabilizing the portable hair dryer HD. The ring-shaped holder can be formed out of a metal threaded rod, such that threads along the length of the rod form the friction-enhancing interior surface for engagement with the handle of the hair dryer. In a preferred embodiment, the metal threaded rod 51 which forms the ring-shaped holder 50 may be coated with a pliable material 56 selected from a group consisting of an elastomeric material and a rubber material.

FIG. 2 further depicts two hair dryer position securing members each attached to the ring-shaped holder 50 and extending therefrom for engagement with the portable hair dryer HID to aid in selectively positioning the portable hair dryer HD relative to the ring-shaped holder 50. As shown in FIG. 3, these securing members may be in the form of straps 61, 62 having a first and second strap length selectively connectable to each other, such that an adjustable length loop formed by the first 61 and second 62 straps positions the portable hair dryer HD relative to the ring-shaped holder 50.

The holder 50 preferably includes a supported portion 57 which is secured to the conduit 40 and a terminal portion 58 which forms the desired generally ring shape. The terminal portion 58 preferably lies within a single plane 50 that the handle of the hair dryer HD passes through this plane when supported on the support stand 10. The supported portion 57 may either be within this same plane, or may be angled at, e.g., 45° or 90° relative to this plane. The ability of the flexible conduit 40 to rotate about the axis 46 thus allows the plane of the terminal portion 58 to be tilted slightly as desired to position the hair dryer HD.

In a less preferred embodiment, the support stand may include a lower tubular support 22, a flexible conduit 40 selectively positionable within the interior of support 22 and locked in place by a clamp 30, and a holder 50 at the upper end of the conduit 40, as described above. With the elimination of the upper support 24, the conduit 40 achieves both telescopic adjustment and three dimensional positioning. The length of conduit 40 extending from the support 22 may need to be adjusted so that the conduit 40 will hold the hair dryer HD in its desired position.

FIG. 1 also depicts that the present invention may include a hairbrush receptacle 70. The hairbrush receptacle 70 has a throughbore 72 in the base for receiving the lower end of the first support member 22 of the telescopically adjustable extension subassembly 20 which is secured to the support base 10. The hairbrush receptacle 70 circumferentially surrounds the telescopically adjustable extension 20 such that it may receive and hold any desirous hair accessories, such as brushes, hair spray, hair gels, etc., within its circumference.

Based on the foregoing disclosure, those skilled in the art will appreciate that the stand of the present invention may include other modifications. One such modification would be to include a different support base wherein the assembly support would include a clamp for securing the lower end of the first supporting member 22 to a chair or other stabilizing object. FIG. 3 depicts a suitable clamp assembly 82 at the lower end of member 22 for this purpose. The clamp assembly 82 may have any desired configuration, and as shown comprises a generally C-shaped clamp 81 and a threaded clamping member 83. Further, the base may include a wall mount for securing the support to a wall. FIG. 4 depicts a mounting plate 84 secured to a wall 20. A pivot mechanism 86 allows the tubular member 22 to be oriented at a desired angle relative to the wall when in use, and to be swung generally parallel to the wall for storage. These modifications may incorporate the previously described features of the present invention, and illustrate the various applications that are possible with the present invention.

The foregoing disclosure and description of the self-supporting telescopically adjustable stand is illustrative and explanatory thereof. It will be appreciated by those skilled in the art that various changes in the size, shape and materials, as well as in the details of the illustrated construction or combinations of features of the self-supporting telescopically adjustable stand may be made without departing from the spirit of the invention, which is defined by the claims.

What is claimed is:

1. A self-supporting telescopically adjustable support stand for a portable hair dryer, comprising;
    a support base to stabilize the support stand;
    a telescopically adjustable extension subassembly having an extension axis substantially perpendicular to the planar lower supporting surface, the extension subassembly including at least first and second support members each having respective upper and lower ends and at least one support locking member, the first support member having a lower end fixedly secured to the support base and having an interior bore therein to slidingly receive the second support member therein, such that the spacing between the support base and the upper end of the second support member selectively adjusted and temporarily fixed by the at least one support locking member;
    an elongated flexible connection having a supported end connected to the upper end of the second support member and a terminal end selectively positionable with respect to the supported end both in a direction parallel to the extension axis and in directions within a plane perpendicular to the extension axis, such that the terminal end of the flexible extension selectively positionable relative to the supported end at multiple locations; and
    a generally ring-shaped holder supported by the terminal end of the flexible extension, the ring-shaped holder having a through passage therein for receiving a handle of the portable hair dryer and being formed from a threaded rod, such that threads along the length of the rod form a friction-enhancing interior surface for engagement with the handle of the hair dryer.

2. The support stand as defined in claim 1, further comprising:
    one or more hair dryer position securing members each attached to the ring-shaped holder and extending therefrom for engagement with the hair dryer to selectively position the hair dryer relative to the ring-shaped holder.

3. The support stand as defined in claim 2, wherein the one or more hair dryer positioning members include first and second straps each attached to the ring-shaped holder and having a respective first and second strap length selectively connectable to each other, such that an adjustable length loop formed by the first and second straps positions the hair dryer relative to the ring-shaped holder.

4. The support stand as defined in claim 1, wherein the threaded rod is a metal rod and the metal threaded rod is coated with a pliable material selected from a group consisting of an elastomeric material and a rubber material.

5. The support stand as defined in claim 1, wherein an end of the threaded rod is threadably attached to the terminal end of the flexible extension.

6. The support stand as defined in claim 1, wherein the support base is formed from metal.

7. The support stand as defined in claim 6, wherein the metal support base is generally disk-shaped.

8. The support stand as defined in claim 1, further comprising: a non-slip pad secured to the substantially planar lower supporting surface of the support base.

9. The support stand as defined in claim 1, further comprising:
    a hairbrush receptacle having a throughbore in a receptacle base for receiving the telescopically adjustable extension, the hairbrush receptacle having a receptacle opening circumferentially surrounding the telescopically adjustable extension the hairbrush receptacle being supported on the support base.

10. The support stand as defined in claim 1, wherein each of the first and second support members are tubular members, and wherein the flexible member is a flexible conduit.

11. The support stand as defined in claim 1, wherein the elongated flexible extension has an elongated flexible extension axis, and wherein the terminal end of the flexible extension is rotatable with respect to the supported end of the flexible extension about the elongated flexible extension axis, such that the ring-shaped holder may be selectively tilted relative to the supported end of the flexible extension.

12. The support stand as defined in claim 1, wherein the base has a substantially planar lower supporting surface and a weight sufficient to stabilize the support.

13. The support stand as defined in claim 1, wherein the base includes a clamp for securing the support to a support member.

14. The support as defined in claim 1, wherein the base includes a wall mount for securing the support to a wall.

15. A self-supporting telescopically adjustable support stand for a portable hair dryer, comprising:

a metal support base having a weight sufficient to stabilize the support stand, the support base having a substantially planar lower supporting surface;

a non-slip pad secured to the substantially planar lower supporting surface of the support base;

a telescopically adjustable extension subassembly having an extension axis substantially perpendicular to the planar lower supporting surface, the extension including at least first and second support members each having respective upper and lower ends and at least one support locking member, the first support member having a lower end fixedly secured to the support base and having an interior bore therein to slidingly receive the second support member therein, such that the spacing between the support base and the upper end of the second support member selectively adjusted and temporarily fixed by the at least one support locking member;

a hairbrush receptacle having a throughbore in a receptacle base for receiving the telescopically adjustable extension, the hairbrush receptacle having a receptacle opening circumferentially surrounding the telescopically adjustable extension;

an elongated flexible connection having a supported end connected to the upper end of the second support member and a terminal end selectively positionable with respect to the supported end both in a direction parallel to the extension axis and in directions within a plane perpendicular to the extension axis, such that the terminal end of the flexible extension selectively positionable relative to the supported end at multiple locations;

a generally ring-shaped holder formed from a threaded rod secured to the terminal end of the flexible extension, the ring-shaped holder defining a through passage therein for receiving a handle of the portable hair dryer, such that threads along the length of the rod form a friction-enhancing interior surface for engagement with the handle of the hair dryer; and first and second straps each attached to the ring-shaped holder and extending therefrom for engagement with the hair dryer to selectively position the hair dryer relative to the ring-shaped holder, each strap having a respective first and second strap length selectively connectable to each other, such that an adjustable length loop formed by the first and second straps positions the hair dryer to the ring-shaped holder.

16. A self-supporting telescopically adjustable support stand for a portable hair dryer, comprising:

a support base having a weight sufficient to stabilize the support stand, the support base having a substantially planar lower supporting surface;

a telescopically adjustable extension subassembly having an extension axis substantially perpendicular to the planar lower supporting surface, the extension subassembly including at least first and second support members each having respective upper and lower ends and at least one support locking member, the first support member having a lower end fixedly secured to the support base and having an interior bore therein to slidingly receive the second support member therein, such that the spacing between the support base and the upper end of the second support member selectively adjusted and temporarily fixed by the at least one support locking member;

an elongated flexible connection having a supported end connected to the upper end of the second support member and a terminal end selectively positionable with respect to the supported end both in a direction parallel to the extension axis and in directions within a plane perpendicular to the extension axis, such that the terminal end of the flexible extension selectively positionable relative to the supported end at multiple locations, a generally ring-shaped holder supported by the terminal end of the flexible extension, the ring-shaped holder defining a through passage therein for receiving a handle of the portable hair dryer; and a hairbrush receptacle having a throughbore In a receptacle base for receiving the telescopically adjustable extension the hairbrush receptacle being supported on the support base, the hairbrush receptacle having a receptacle opening circumferentially surrounding the telescopically adjustable extension.

17. The support stand as defined in claim 16, further comprising:

one or more hair dryer position securing members each attached to the ring-shaped holder and extending therefrom for engagement with the hair dryer to selectively position the hair dryer relative to the ring-shaped holder.

18. The support stand as defined in claim 16, wherein each of the first and second support members are tubular members, and wherein the flexible member is a flexible conduit.

19. The support stand as defined in claim 16, wherein the elongate flexible extension has an elongated flexible extension axis, and wherein the terminal end of the flexible extension is rotatable with respect to the supported end of the flexible extension about the elongate flexible extension axis, such that the ring-shaped holder may be selectively tilted relative to the supported end of the flexible extension.

* * * * *

UNITED STATES PATENT AND TRADEMARK OFFICE
CERTIFICATE OF CORRECTION

PATENT NO. : 6,199,805 B1  Page 1 of 1
DATED : March 13, 2001
INVENTOR(S) : Rebecca Pena It is certified that error appears in the above-identified patent and that said Letters Patent is hereby corrected as shown below:

Column 6,
Line 59, before "the" insert -- , --.

Column 8,
Line 16, line 35, "In" should be read -- in --.

Signed and Sealed this

Eighteenth Day of December, 2001

Attest:

JAMES E. ROGAN
Attesting Officer   Director of the United States Patent and Trademark Office